United States Patent [19]

Rounds

[11] Patent Number: 4,637,904

[45] Date of Patent: Jan. 20, 1987

[54] PROCESS FOR MOLDING A POLYMERIC LAYER ONTO A SUBSTRATE

[75] Inventor: Nicholas A. Rounds, New Britain, Pa.

[73] Assignee: Rohm and Haas Company, Philadelphia, Pa.

[21] Appl. No.: 551,445

[22] Filed: Nov. 14, 1983

[51] Int. Cl.$^4$ .................. B29C 39/10; B29C 39/42

[52] U.S. Cl. ...................... 264/1.4; 264/1.9; 264/2.3; 264/2.4; 264/22; 264/511; 264/107; 264/265; 264/279

[58] Field of Search .............. 264/259, 265, 271.1, 264/279, 279.1, 1.4, 1.9, 2.4, 22, 106, 511, 1.3, 2.3, 107; 425/810

[56] References Cited

U.S. PATENT DOCUMENTS

| | | | |
|---|---|---|---|
| 2,912,418 | 11/1959 | Johnson et al. | 264/2.4 |
| 3,991,146 | 11/1976 | Barrie | 264/279 |
| 4,022,855 | 5/1977 | Hamblen | 264/22 |
| 4,038,663 | 7/1977 | Day et al. | 369/72 |
| 4,061,518 | 12/1977 | Burroughs et al. | 264/1.9 |
| 4,080,233 | 3/1978 | McCloskey | 264/259 |
| 4,157,931 | 6/1979 | Bricot et al. | 264/106 |
| 4,188,433 | 2/1980 | Dijkstra et al. | 369/288 |
| 4,190,621 | 2/1980 | Greshes | 425/808 |
| 4,199,421 | 4/1980 | Kamada et al. | 264/1.4 |
| 4,304,806 | 12/1981 | Anderson et al. | 264/106 |
| 4,364,879 | 12/1982 | Gut et al. | 264/22 |
| 4,386,123 | 5/1983 | Coburn, Jr. | 264/2.4 |
| 4,407,880 | 10/1983 | Terao et al. | 264/106 |
| 4,419,314 | 12/1983 | Bush | 264/279 |
| 4,441,694 | 4/1984 | Curran | 264/259 |
| 4,472,124 | 9/1984 | Kashihara et al. | 425/290 |
| 4,477,328 | 10/1984 | Broeksema et al. | 264/22 |
| 4,482,511 | 11/1984 | Komatsubara | 264/22 |

*Primary Examiner*—Jeffery Thurlow
*Attorney, Agent, or Firm*—Jordan J. Driks

[57] ABSTRACT

Process for forming a polymeric layer on a substrate comprises placing a substrate to be coated in a mold having a removable lid, injecting a liquid monomer into the mold and into contact with the surface of the substrate to be coated, holding the substrate in place in said mold prior to curing said monomer, radiation curing the liquid monomer, releasing the hold on said substrate prior to significant shrinkage of the curing liquid monomer, and venting said mold to atmospheric pressure at the portion of the mold remote from the surface of the substrate being coated and prior to significant shrinkage of said liquid monomer whereby the substrate moves toward the removable lid. Thereafter, the substrate, which now has a polymeric layer affixed thereto, is removed from the mold.

19 Claims, No Drawings

PROCESS FOR MOLDING A POLYMERIC LAYER ONTO A SUBSTRATE

BACKGROUND OF THE INVENTION

This invention relates to a molding process for forming a polymeric layer on a substrate whereby the polymeric layer has a substantially uniform thickness within certain specified close tolerances. More specifically, this invention relates to a molding process, as aforesaid, wherein the polymeric layer is optically transparent. Even more specifically, this invention relates to a molding process for preparing a dust cover for an information disc.

Many molded articles have protective layers, which may be polymeric layers, as a coating on the molded article. In some instances, dimensional control of the thickness of the polymeric coating is not significant. In other instances, such as when the polymeric coating is to serve as a dust cover for an information disc, dimensional control of the thickness of the polymeric coating affixed to the information disc becomes important because these discs are read by a laser and dimensional variations in the thickness of the polymeric coating will interfere with the laser reading of the disc.

This invention, although applicable to applying a polymeric coating to any substrate for any purpose whatsoever, is particularly applicable to polymeric coatings for information storage devices which, may have a shape other than that of a disc. The invention will be described in connection with an information disc because the uniform thickness of the polymeric coating and the optical transparency, particularly laser light transparency, of said coating render the invention particularly suitable for use with information storage devices such as an information disc.

Coatings affixed to a substrate may be prepared by dipping the substrate into a coating composition, gluing a preformed coating onto the substrate, rolling a coating composition onto the substrate or by molding a coating composition onto a substrate itself. In some instances, a polymeric coating composition is dissolved in a solvent and the substrate is then coated with the solution and the solvent allowed to evaporate. In other instances, the coating composition, sans solvent, is placed on the substrate and the composition is then cured to form a polymeric layer affixed to the substrate.

One process for forming a polymeric layer upon a substrate involves the use of a two part mold wherein deformable gaskets are provided between the mold halves. These deformable gaskets, which are responsive to the application of external pressure (such as clamping the mold halves), allow the two parts of the mold to come toward one another when the molding process is conducted. The reason the mold halves are moved toward one another is to compensate for shrinkage which occurs when the coating composition is cured. If this external pressure is not applied in a uniform manner, the surface quality of the resultant polymeric coating will be poor. In addition, this process, suffers from poor dimensional control which results in wide, undesired thickness variations.

U.S. Pat. No. 4,188,433 is directed to a record carrier in disc form having a cover layer thereon. The U.S. Pat. No. 4,188,433 teaches that it is undesirable to coat a record carrier with a lacquer and then cure it because the outer portion of the lacquer cures before the inner portion of the lacquer cures and that the curing time is too long. The U.S. Pat. No. 4,188,433 teaches that, as a result of this uneven curing, it is difficult to get a smooth layer and that the layer is uneven and may result in the warping of the record carrier or in delamination of the lacquer layer.

U.S. Pat. No. 4,038,663 relates to information discs in general. The U.S. Pat. No. 4,038,663 teaches that a preformed plastic foil is spaced from a disc and is then pulled to the disc by vacuum. This process is not a molding process because the plastic foil has been preformed. The process is, instead, a process for attaching a preformed plastic foil to a disc.

U.S. Pat. No. 4,190,621 is directed to a process for manufacturing bifocal lenses. The U.S. Pat. No. 4,190,621 teaches that the lower part of a mold can be moved to compensate for shrinkage when molding a plastic bifocal lens.

None of the aforedescribed molding processes compensated for shrinkage, during curing of a coating composition, by the free movement of the substrate, within the mold itself.

An object of this invention therefore is to provide a process for forming a polymeric layer on a substrate.

Another object of this invention is to provide a molding process for forming an optically transparent polymeric layer on a substrate.

Yet another object of this invention is to provide a process for forming an optically transparent polymeric layer upon a substrate wherein the polymeric layer has a precise thickness.

Still another object of this invention is to provide a process for forming an optically transparent polymeric layer upon an information storage device such as a disc.

Other objects and advantages will become apparent from the following more complete description and claims.

DETAILED DESCRIPTION

Broadly, this invention contemplates a process for forming a polymeric layer on a substrate comprising placing a substrate to be coated in a mold having a removable lid, injecting a liquid monomer into said mold and into contact with the surface of the substrate to be coated, holding the substrate in place in said mold, radiation curing said liquid monomer, releasing the hold on said substrate prior to significant shrinkage of the curing liquid monomer, and venting said mold to atmospheric pressure at the portion of the mold remote from the surface of the substrate being coated and prior to significant shrinkage of said liquid monomer whereby said substrate moves toward said removable lid, and removing the substrate having a polymeric layer affixed thereto, from the mold.

It was surprising to find that even though the coating composition shrinks during cure, a molder can obtain surface smoothness and precise dimensional control over the resultant polymeric coating. The polymeric coating is not only affixed to the substrate as a natural incident of the process, but the thickness of the polymeric coating is substantially precise. Further, when a flat polymeric coating is desired, the process results in a flat coating which may vary by up to about ±10% of the total polymeric coating thickness.

Generally speaking, the invention may be practiced by placing a substrate, such as an information disc, into a mold and seating or holding it accurately. The mold lid, in this case flat glass, is closed against the die or mold and is clamped in place. At this point the holding or seating means, such as a vacuum, may be released, or it may be released later but prior to the occurrence of significant shrinkage of the composition after exposure to radiation for curing purposes. A liquid coating formulation is pumped into the mold between the top of the information disc and the lid. In one embodiment, the mold is in a near vertical position, so as to place the substrate in a near vertical position, and the mold is filled from the bottom, adjacent to the substrate surface to be coated. This procedure reduces the possibility of entrapping air bubbles in the mold and thus adversely affecting the resultant polymeric coating. The filled mold is exposed to ultra violet rays. The holding or seating means, if not previously released, is now released prior to significant shrinkage of the curing coating composition. Cure time will vary depending upon the source of radiation used to cure the coating composition. The mold is opened and the finished optical polymerically coated disc is removed. Any overflow from the sides of the mold is trimmed away.

When the mold is filled, the coating composition contacts the surface of the substrate being coated and the lid. When the vacuum or other holding or seating means is released and the coating composition is exposed to radiation, it is believed that the coating composition begins to cure and that the resultant shrinkage causes a force to move the substrate, which is free to move, toward the lid, thus overcoming the deleterious effect of shrinkage. The resultant polymeric coating has a smooth surface and a precise dimensional thickness. The invention, however, is not to be construed as limited to the foregoing theory of the mechanism of this invention or to any particular mechanism.

The resultant polymeric coating on the substrate is substantially dimensionally precise throughout. Further, by molding in the aforedescribed manner, stresses in the polymeric coating and surface irregularities of the polymeric coating are substantially avoided as compared to other molding processes.

If desired, a positive pressure may be applied to the side of the substrate remote from the coating composition to enhance the movement of the substrate toward the lid when the coating composition is being cured.

When such a positive pressure is applied, the mold itself remains stationary and only the substrate, with the coating composition, moves toward the clamped mold lid.

The amount of positive pressure may vary widely and need be only great enough to counteract gravitational or frictional forces.

The positive pressure may be applied through the same port, referred to below, which is used to provide a vacuum to the substrate to seat and hold it in place.

The mold which is used may be a two piece mold or die. The lid of the mold is clamped onto the die so that the resultant polymeric coating will assume the desired configuration. The mold may also be provided with a port to supply a vacuum to the substrate to hold it in place. The vacuum which is provided need only be sufficient to hold the substrate in place and prevent movement of the substrate prior to release of the vacuum.

Other means may be provided for holding the substrate in place in the mold. For example, instead of applying a vacuum to the substrate, one may equip the mold, in the area where the substrate is to be held, with retractable gaskets which would be extended against the substrate when it is to be held in place and retracted when the substrate need be free to move.

The vacuum, or other holding means, which results in the seating and holding of the substrate in the mold may be released before the coating composition has been exposed to a source of radiation for curing it or after such exposure has taken place. If the vacuum or other holding means is released subsequent to exposing the coating composition to radiation, then such release should be accomplished before any significant shrinkage of the curing coating composition occurs.

The claims of this invention shall not be construed as limited to releasing the vacuum or other holding means to either before or after radiation curing commences since both embodiments are included herein.

When the vacuum or other holding means is released, and prior to significant shrinkage of the curing coating composition, the mold is vented to atmospheric pressure to assure that the substrate will be free to move toward the lid of the mold during cure. Such venting takes place in that portion of the mold which is remote from the surface of the substrate being coated.

In order to avoid surface flaws in the final polymeric coating, several factors must be taken into consideration. First, the substrate must be accurately seated or held in place prior to curing the coating composition. It is preferred that such seating or holding take place prior to injecting the coating composition into the mold. Second, the mold must be vented to atmospheric pressure at the portion of the mold remote from the surface of the substrate being coated and prior to significant shrinkage of the coating composition after it has been exposed to radiation for curing purposes. Venting is necessary because as the coating composition polymerizes, the composition shrinks and creates a vacuum which, if allowed to remain, may inhibit movement of the substrate toward the removable lid. It is preferred that such venting to atmospheric pressure take place prior to irradiating the coating composition during cure of the coating composition and that the pressure within the mold or die be at least atmospheric pressure.

Significant shrinkage of the coating composition is the point, during cure, when the substrate, if not free to move will result in surface flaws in the final polymeric coating. That point may be determined through trial runs by one skilled in the art.

Surface flaws may be determined by visual inspection or by inspection of the coated substrate under a microscope of up to 100 power.

A port may also be provided in the mold for injection of the coating composition or the coating composition may be poured into the open mold prior to clamping the lid in place.

The mold itself may be positioned so that the substrate moves toward the lid in a horizontal manner or may be positioned in any other suitable manner. The mold may also be placed so that the substrate moves vertically.

The mold, at the point where the substrate rests prior to radiation curing the coating, may be equipped with a flexible gasket, which will seal the substrate edges from the mold edges to minimize or prevent leakage around the edges of the substrate. If a flexible gasket is used, it may also be lubricated to assure that movement of the substrate will not be limited. Additionally, the flexible gasket may be applied more forceably against the edges of the substrate when a retractable gasket is used. Alternatively, the substrate may be placed in the mold without the necessity of using a gasket and relying only upon close tolerances between the edges of the substrate and the wall of the mold so as to permit movement of the substrate when the coating composition is radiation cured and the vacuum, when used, is released.

In one embodiment of this invention, a disc weighing 390 grams is placed in a mold and a coating composition weighing 16 grams is placed in the mold and cured. The resultant polymeric layer on the substrate is 7 mils thick.

The operational distance between the substrate, held in the bottom of the mold, and the lid may vary. That distance is governed by the desired thickness of the polymeric coating to be placed on the substrate, taking into account the degree of shrinkage of the coating composition when cured. The thickness of a polymeric coating made according to this invention and affixed to, for example, an information disc, will generally be at least about 2 mils. The maximum thickness is governed only by practical and economic considerations and may even exceed 400 mils. Preferably, the coating thickness is from about 4 mils to about 150 mils. When molding a polymeric coating onto a substrate, the space between the substrate and the lid is filled with coating composition to assure that air bubbles will not be present in the final polymeric coating and to further assure that the coating adheres to the lid, whether of glass or some other material, and to the substrate, during cure so that the forces involved may operate.

The coating composition itself may be any liquid radiation curable monomer. When the coating composition is to be used to form an optically transparent polymeric coating on an information disc, then the monomer used should be one which will result in such an optically transparent polymeric coating.

The radiation curable coating composition may be composed of only the radiation curable monomer or it may contain other components such as oligomer, photoinitiator if ultra violet radiation is to be used to cure the composition, and surfactant.

Any radiation curable monomer may be used which will result in an optically transparent polymeric coating when cured. Generally, any ethylenically unsaturated monomer may be used which is capable of being cured into an optically transparent coating. Among the monomers which may be used are acrylates or methacrylates which are free radical polymerizable and which have one or more ethylenically unsaturated groups. This class includes vinyl monomers, allyl monomers as well as the aforesaid acrylic and methacrylic monomers. The monomers which may be used also include vinyl ethers, N-vinyl monomers, and epoxy monomers which polymerize by means of a cationic ring opening. The vinyl ether, N-vinyl monomers and epoxy monomers may be used in conjunction with a cationic photoinitiator as is set forth in U.S. Pat. Nos. 4,108,747; 4,102,687; 4,058,401; and 4,058,400. Additionally, esters of acryloxypropionic acid may also be used, as the radiation curable monomer, such as the di(beta-acryloxypropionic acid) of neopentyl glycol or of ethylene glycol, diethylene glycol, and butyl glycol, and the like.

Among the monomers which may be used are pentaerythritol tetraacrylate and triacrylate, tris(2-acryloxyethyl)isocyanurate, tris)2-methyacryloxyethyl)isocyanaurate, 2-acetoxyethyl methacrylate, tetrahydrofurfurylmethacrylate, diacetone acrylamide, acrylamidoethyl methacrylate, 1,6-hexane diol diacrylate, tetraethylene glycol diacrylate, 1,4-butane diol dimethacrylate, tripropylene glycol diacrylate, diethylene glycol diacrylate, diethylene glycol dimethacrylate, ethylene glycol diacrylate, neopentyl glycol diacrylate, butyl acrylate, isobutyl acrylate, butyl methacrylate, glycidyl acrylate, glycidyl methacrylate, isobornyl acrylate, cyclohexyl acrylate, phenyl acrylate, tertiary-butyl acrylate, trimethylol propane triacrylate, glycerol triacrylate, the triacrylate of ethoxylated and/or propoxylated trimethylol propane, the diacrylate of ethoxylated and/or propoxylated neopentyl glycol or ethylene glycol or diethylene glycol and/or butyl glycol and the like.

The monomer may comprise the entire radiation curable coating composition or it may be present in an amount of from about 20 to about 100 parts by weight of the entire composition.

An oligomer may be present as part of the coating composition and preferably is present in an amount of from 0 to about 60 parts by weight of the entire composition. Certain oligomers may constitute the entire coating composition such as when the oligomer comprises polyethylene glycol diacrylate and dimethacrylate, polypropylene glycol diacrylate and dimethacrylate, and the like. The oligomer, if present, may be a halogenated oligomeric ester acrylate, acrylated urethane, acrylated epoxy, or methacrylate monomer which is compatible with the monomer set forth above. The oligomer must also be compatible with any initiator which may be present and must be such as to not increase the viscosity of the coating composition above about 500 centipoises.

Among the oligomers which may be used is a halogenated polyester acrylate such as those set forth in U.S. Pat. No. 4,227,978, which is incorporated herein by reference.

The radiation curable coating may also have from about 0.1 to about 12 parts by weight of a photoinitiator if the coating is to be ultra violet or visible light cured. Among the initiators which may be used are organic peroxides, azo compounds, aromatic diazonium salts, aromatic iodonium salts, aromatic sulfonium salts, aromatic phosphonium salts, quinones, benzophenones, nitroso compounds acyl halides, aryl halides, hydrazones, mercapto compounds, pyrylium compounds, triarylimidazoles, biimidazoles, chloroalkyltriazines, aromatic carbonyl compounds, and the like. Such photoinitiators and dyes are well known in the art.

If desired, a stabilizer may be present in an amount of up to about 1 part by weight in order to prevent premature polymerization of the monomer containing coating composition during storage.

Among the stabilizers which may be used are hydroquinone and its ethers, phenothiazine, and the like.

If desired, an epoxide or other cationic polymerizable material may be included in the compositions of this invention. The epoxide may be used in an amount of up to about 95 parts by weight of the composition. Among the epoxides which may be used are 3,4-epoxycyclohexylmethyl 3,4-epoxycyclohexanecarboxylate obtained from Union Carbide Company, Epon 828 (a polymer produced by the condensation reaction of epichlorohydrin with bisphenol A) obtained from Shell Chemical Company, and the like.

The coating composition may also contain a flow aid. Although the flow aid is not necessary, such flow aid may be present in amounts of up to about 5 parts by weight. Among the flow aids which may be present are acrylic Modaflow® and Multiflow® polymers obtained from Monsanto Corporation, Byk® 300 series of flow aids obtained from Byk-Mallinckrodt Corporation, and the like.

If desired, a mold release agent and/or a surfactant may also be present.

The viscosity of the coating composition may vary, preferably from about 3 centipoises to about 500 centipoises. Generally, the lower the viscosity of the coating composition, the less is the possibility that air bubbles will be entrapped in the polymeric coating thus adversely affecting said coating.

In order to more fully illustrate the nature of this invention and the manner of practicing the same, the following examples are presented.

EXAMPLE 1

The following UV polymerizable composition is prepared.

|  | PERCENT BY WEIGHT |
|---|---|
| bis(beta-acryloxy propionate) of neopentyl glycol | 97.0% |
| diethoxyacetophenone | 2.0 |
| acryloxy propionic acid (an adhesion promoter) | 1.0 |

An aluminium platter having a center hole which has a diamter of 6.625 inches and an overall diameter of 14.025 inches and a thickness of 0.075 inch is placed in a mold cavity wherein the space between the aluminum platter and the lid of the mold is 8.0 mils. The lid, a glass plate, is clamped to the mold. The area of the mold remote from the surface of the aluminum platter to be coated is evacuated to firmly seat the aluminum platter accurately in the mold. The applied vacuum is then vented to the atmosphere and the vent remains open. The coating composition is then injected, through a port, into the mold cavity between the glass lid and the aluminum platter. The coating composition is cured with a bank of four 15 watt black lamps. The cure time is about 1 minute. The polymeric coated substrate has a coating which has an average thickness of 7.4 mil. within a tolerance of ±0.4 mil as measured using an Eddy current film thickness gauge.

Thickness and flatness control of the resultant polymeric coating affixed to the disc are judged to be good.

EXAMPLE 2

The process of Example 1 is repeated except that the monomeric component is tripropylene glycol diacrylate. Good results are obtained and the substrate has an average thickness of 6.4 mils, which is uniform within a tolerance of ±0.6 mil as determined by Eddy current film thickness gauge. Thickness and flatness control of the coating are thus judged to be good.

EXAMPLE 3

The process of Example 2 is repeated except that an annular 5 mil spacer is placed in contact with the mold and glass lid. The lid is clamped to the spacer and mold. The distance between the disc and glass lid is thereby increased to 13 mils.

There are no surface flaws in the resultant polymeric coating affixed to the disc. The average cured polymeric coating thickness is 11.3 mils ±1.1 mil.

EXAMPLE 4

The process of example 3 is repeated except that a 4 mil annular spacer is used and the spacer is placed so that the disc is between the spacer and the lid. The space between the surface of the disc being coated and the lid is thereby reduced to 4 mils. There are no surface flaws in the resultant polymeric coating affixed to the disc. The average cured polymeric thickness is 1.7 mils.

EXAMPLE 5

The procedure of example 2 is repeated except that the coating composition is 98.0%, by weight, Photomer® 4127 (a propoxylated diol diacrylate obtained from Diamond Shamrock Corp.) and 2% diethoxyacetophenone and is cured with a single medium pressure, high intensity mercury vapro lamp (300 watt per inch, elliptical reflector, ten inch lamp). The lamp is mounted about one meter above the filled mold assembly. The coating composition is irradiated, at the lamp's full power, for twenty seconds. The resultant polymer coated disc showed no evidence of surface flaws. The average cured polymeric thickness is 6.6 mils except for one small area where the average is 4.5 mils. It is believed that this variation is due to the non-uniform intensity of the lamp configuration.

EXAMPLE 6

The procedure of example 1 is repeated except that the coating composition is as follows:

|  | PERCENT BY WEIGHT |
|---|---|
| bis(beta-acryloxy propionate) of diethylene glycol | 96.0 |
| acryloxy propionic acid | 1.0 |
| diethoxyacetophenone | 3.0 |

There are no surface flaws in the resultant polymeric coating affixed to the disc. The average cured polymeric thickness is 6.2 mils ±0.8 mil.

Other liquid monomers, oligomers, initiators and ancillary components may be used in practicing this invention.

As will be readily appreciated, the process of this invention enables one to mold a polymeric coating on a substrate without the necessity of using an expensive mold wherein one part of the mold is designed to move so that the mold and substrate in the mold are both moved together toward the stationary part of the mold.

Instead, the process of this invention contemplates moving only a substrate while the entire mold remains stationary. The process of this invention results in polymeric coatings which have a precise thickness throughout the coating and which are characterized by substantial lack of surface irregularities and negation of stresses.

While this invention has been described in terms of certain preferred embodiments and illustrated by means of specific examples, the invention is not to be construed as limited except as set forth in the following claim.

I claim:

1. Process for forming a polymeric layer affixed to a substrate comprising placing a substrate to be coated in a mold having a removable lid, injecting a liquid monomer, having a viscosity of from about 3 centipoises to about 500 centipoises, into said mold and into contact with the surface of the substrate to be coated, holding the substrate in place in said mold prior to curing said monomer, radiation curing said liquid monomer, releasing the hold on said substrate prior to significant shrinkage of the curing liquid monomer, and venting said mold to atmospheric pressure at the portion of the mold remote from the surface of the substrate being coated and prior to significant shrinkage of said liquid monomer and said substrate moves toward said removable lid while said mold and said removable lid remain stationary, and removing the substrate having a polymeric layer affixed thereto from the mold.

2. A process according to claim 1 wherein said substrate is an information storage substrate.

3. A process according to claim 1 wherein said polymeric layer is optically transparent.

4. A process according to claim 1 wherein said polymeric layer is from about 2 mils to about 150 mils thick.

5. A process according to claim 1 wherein the polymeric layer has a uniform thickness within a tolerance of up to about ±10%.

6. A process according to claim 1 wherein said monomer comprises tripropylene glycol diacrylate.

7. A process according to claim 1 wherein said monomer comprises tetraethylene glycol diacrylate.

8. A process according to claim 1 wherein said monomer comprises neopentyl glycol diacrylate.

9. A process according to claim 1 wherein said liquid monomer comprises the diacrylate of ethoxylated and/or propoxylated neopentyl glycol.

10. A process according to claim 1 wherein said monomer comprises ethylene glycol diacrylate.

11. A process according to claim 1 wherein said monomer comprises an ester of acryloxypropionic acid.

12. A process according to claim 1 wherein said monomer comprises neopentyl glycol di(beta-acryloxypropionic acid).

13. A process according to claim 1 wherein said monomer comprises diethylene glycol di(beta-acryloxypropionic acid).

14. A process according to claim 1 wherein said radiation is ultra violet radiation.

15. A process according to claim 1 wherein said substrate is an information storage device.

16. A process according to claim 1 wherein a positive pressure is applied, during curing of said liquid monomer, to the surface of the substrate opposite the surface being coated and said mold is stationary during said process.

17. A process according to claim 1 wherein said substrate is held in place by applying a vacuum to the side of the substrate opposite the side of the substrate being coated and, prior to or when said radiation curing is initiated, releasing said vacuum.

18. A process according to claim 1 wherein said hold on said substrate is released prior to said radiation curing.

19. A process according to claim 1 wherein said hold on said substrate is released subsequent to said radiation curing and prior to significant shrinkage of the curing liquid monomer.

* * * * *